(12) United States Patent
Huang

(10) Patent No.: US 6,789,326 B1
(45) Date of Patent: Sep. 14, 2004

(54) STRUCTURE OF HANDLE FOR MINI-HANDSAW

(76) Inventor: Yin-Hai Huang, P.O. Box 697, Feng-Yuan City, Taichung Hsien (TW), 420

( * ) Notice: Subject to any disclaimer, the term of this patent is extended or adjusted under 35 U.S.C. 154(b) by 18 days.

(21) Appl. No.: 10/412,308

(22) Filed: Apr. 14, 2003

(51) Int. Cl.⁷ .............................................. B23D 51/01
(52) U.S. Cl. ................................ 30/517; 30/162; D8/97
(58) Field of Search .......................... 30/517, 162, 507; D8/95, 97

(56) References Cited

U.S. PATENT DOCUMENTS

| | | | | |
|---|---|---|---|---|
| 4,794,692 A | * | 1/1989 | Wang | 30/123 |
| 4,827,619 A | * | 5/1989 | Alm | 30/507 |
| 4,884,307 A | * | 12/1989 | Flood | 7/156 |
| 5,584,123 A | * | 12/1996 | Chi | 30/125 |
| 5,661,908 A | * | 9/1997 | Chen | 30/125 |
| D411,429 S | * | 6/1999 | Gringer | D8/95 |
| 5,911,481 A | * | 6/1999 | Yost | 30/125 |
| D414,670 S | * | 10/1999 | Linden | D8/99 |
| 6,467,173 B1 | * | 10/2002 | Umstead et al. | 30/144 |

* cited by examiner

*Primary Examiner*—Charles Goodman

(57) ABSTRACT

A structure of handle for mini-handsaw includes a handle having a gap to engage a saw blade therein, a slider in cooperation with a locking member slidably engaged within a rectangular opening of the handle for releasably gripping the inner end of the blade and a swivel arrester fastening the middle portion of the blade through a slot and a depression of the handle. This handle is characterized in a convenient embedment or disengagement of the saw blade and the engagement is very stable.

8 Claims, 8 Drawing Sheets

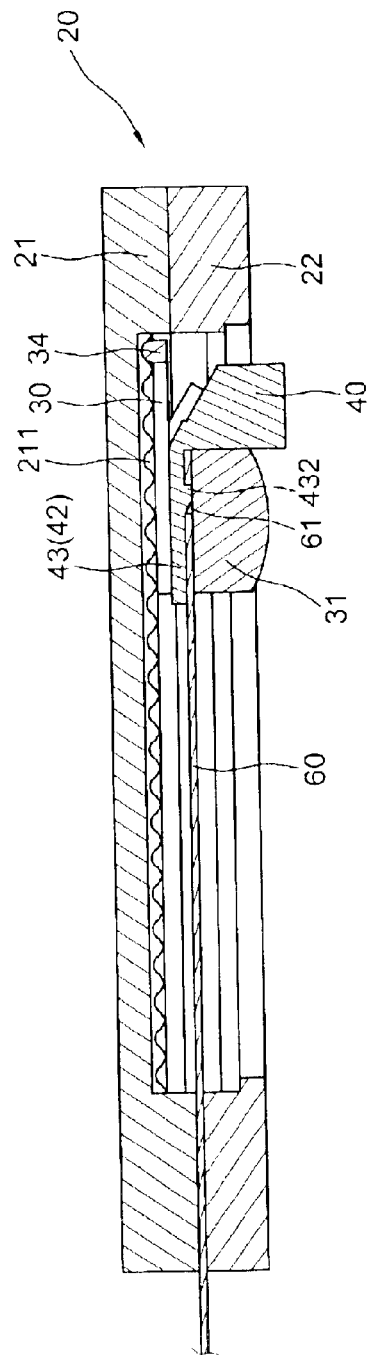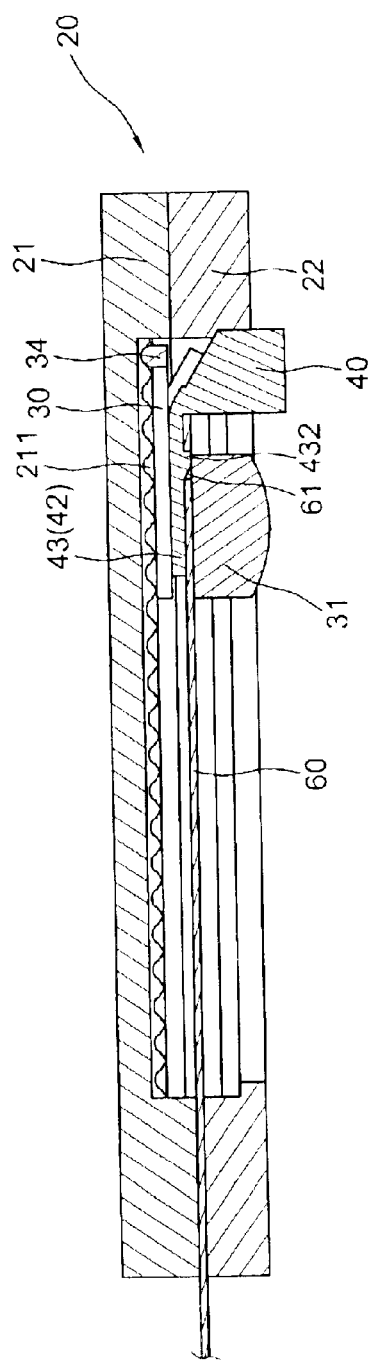

STRUCTURE OF HANDLE FOR MINI-HANDSAW

BACKGROUND OF THE INVENTION

The present invention relates to handicraft tools and more particularly to a structure of handle for mini-handsaw which provides a convenient engagement or disengagement of the saw blade within the handle and the engagement is very stable.

A prior art mini-handsaw 10 (as shown in FIG. 1) comprises a handle 11, a longitudinal slit 12 in the handle 11 extended along the length thereof, a bowed frame 13 integrated with the front end of the handle 11 including a through hole 131 in free end. When a saw blade 14 inserts into the slit 12 of the handle 11, its outer end is fixed by a bolt 16 and a hexagonal looking plate 15. This mini-handsaw 10 has a disadvantage. Each time fastening or unfastening the looking plate 15 must use a tool and due to the unstable fastening manner, the saw blade 14 may be loosened often. So that the operator has to fasten the looking plate 15 repeatedly, causing great inconvenience to the operator.

SUMMARY OF THE PRESENT INVENTION

The present invention has a main object to provide a structure of handle for mini-handsaw in which the saw blade is readily to assemble or disassemble into the handle without using a tool.

Another object of the present invention is to provide a structure of handle for mini-handsaw which has two fixed points to hold the saw blade so that the engagement of the saw blade within the handle is very stable.

Further object of the present invention is to provide a structure of handle for mini-handsaw in which the saw blade is slidable in the handle in order to adjust the outside length of the saw blade.

Accordingly, the structure of handle for mini-handsaw of the present invention comprises generally a hollow interior handle combined with a pair of first and second halves so as to define an elongate slit therein for receiving the inner pat of a saw blade, a slider, a locking member and a swivel arrester. The handle has a plurality of transverse grooves and a plurality of guides formed in inside walls and extended along the length thereof. The slider connected with the locking member slidably engaged within a rectangular opening of the handle wherein the locking member has a blade holder for holding the inner end of the saw blase and the slider has a stopper for selectively engaging into one of the transverse grooves. The swivel arrester has a T-shaped lock for fixing the saw blade at a front end of the handle. When pulls the locking member rearward relative to the handle, an inner sliding plate forces the stopper of the slider engaged into one of the vertical positioning grooves so as to restrain the longitudinal movement of the saw blade. If presses the press block of the locking member inward, the saw blade can be able to disengaged with blade holder and sets free to draw out of the handle.

The present invention will become more fully understood by reference to the following detailed description thereof when read in conjunction with the attached drawings.

BRIEF DESCRIPTION OF THE DRAWINGS

FIG. 7 is a sectional view to show that the slider is able to slide in the handle, FIG. 8 is a sectional view to show that the slider is unable to slide in the handle.

DETAILED DESCRIPTION OF THE PREFERRED EMBODIMENT

Figure 1:
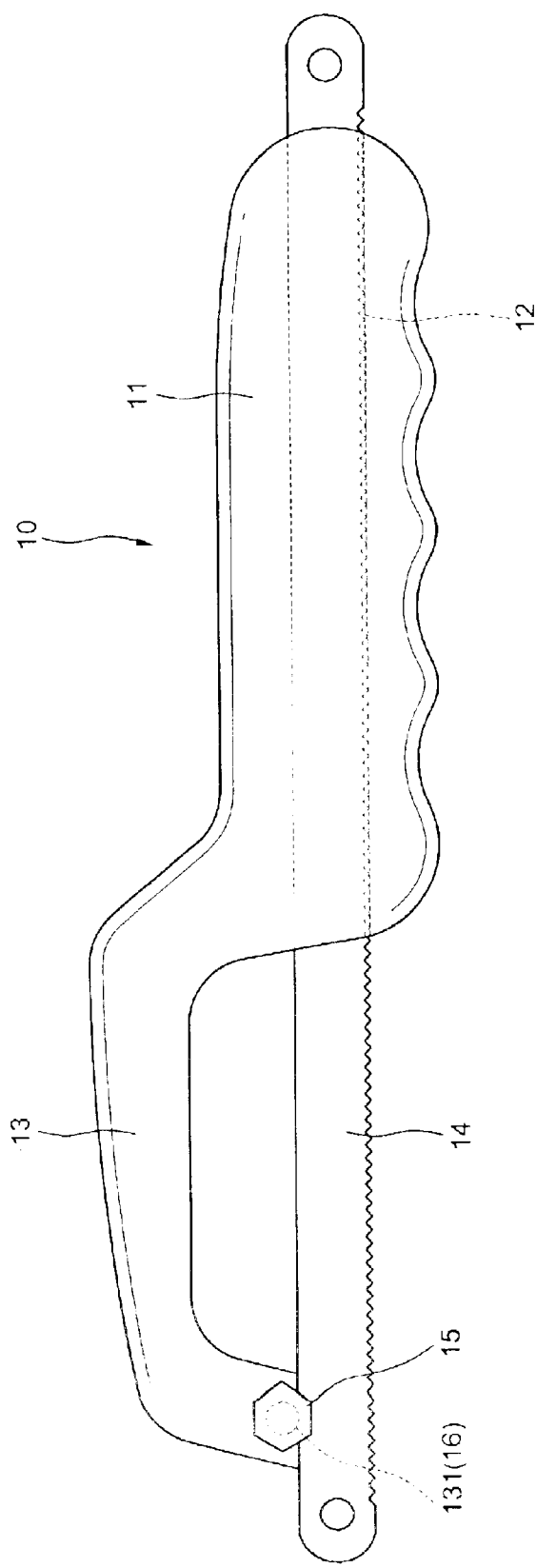
FIG. 1 is a plane view to show a mini-handsaw according to a prior art.
Figure 2:
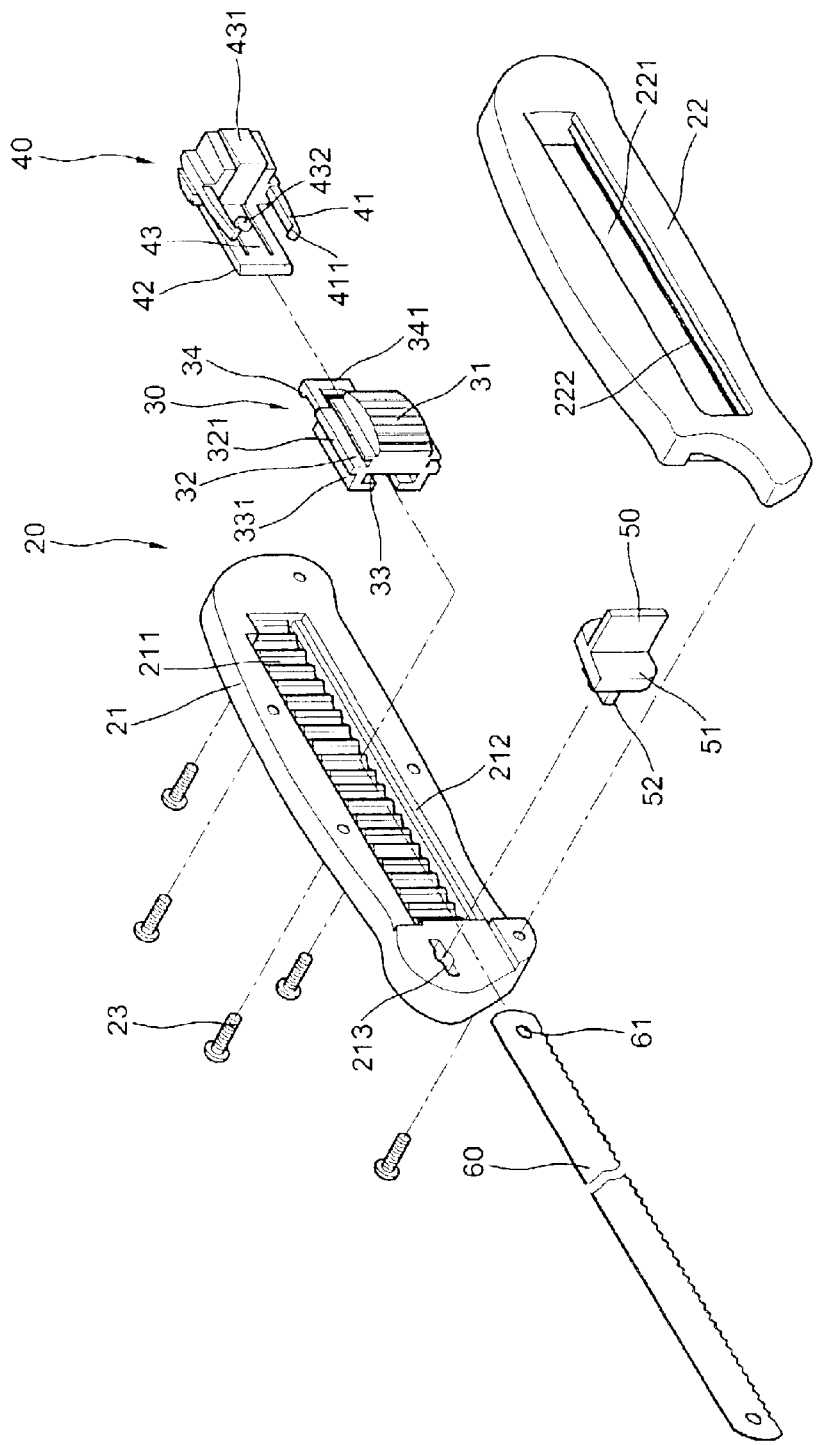
FIG. 2 is an exploded perspective view to show a mini-handsaw of a preferred embodiment according to the present invention.
Figure 3:
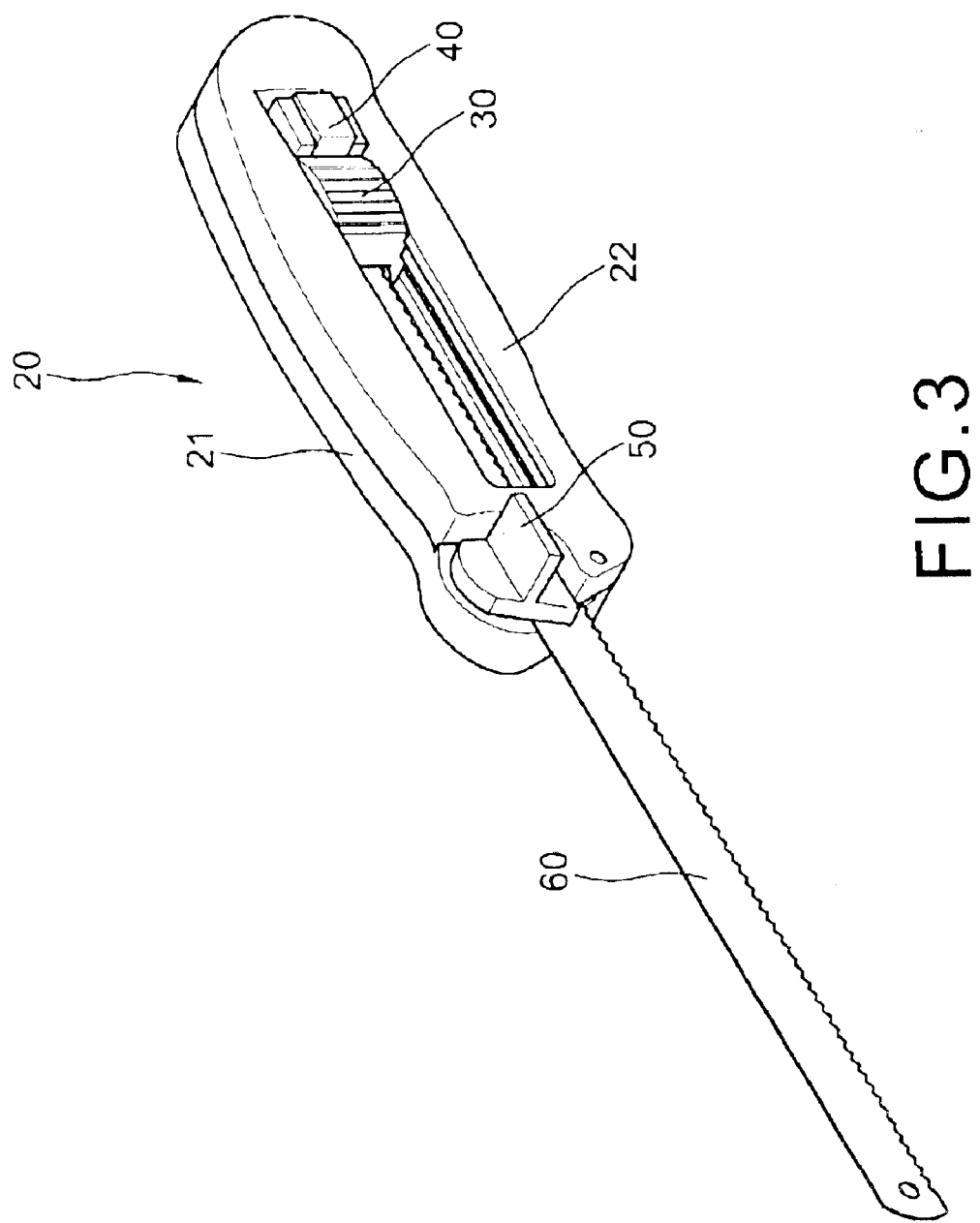
FIG. 3 is a perspective view to show the assembly of FIG. 2.

With reference to the drawings and initialed from FIGS. 2 and 3, the structure of handle for mini-handsaw of the present invention comprises a hollow interior handle 20, a slider 30, a locking member 40, a swivel arrester 50 and a saw blade 60.

Figure 10:
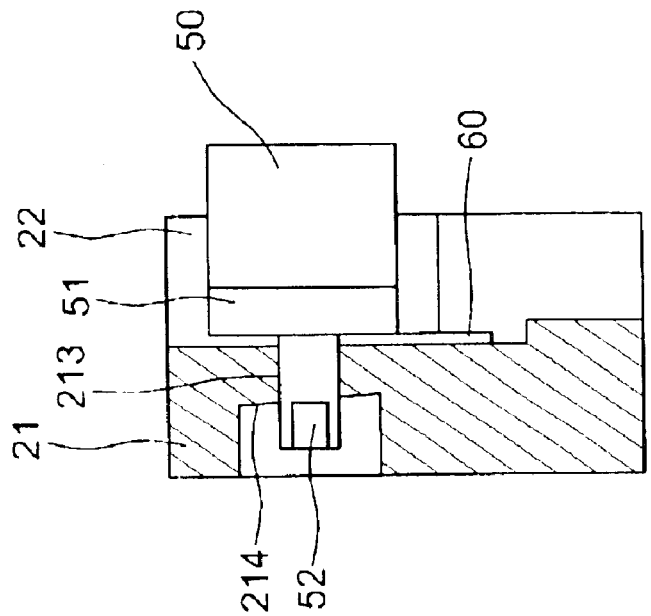
FIG. 10 is a sectional view to show that the swivel arrester is at a loose position.

The handle 20 is combined with a first and a second halves 21 and 22 and secured by a plurality of bolts 23, a gap is defined between the two halves 21 and 22 for permitting the saw blade 60 to insert into the handle 20. The first half 21 has a plurality of vertical positioning grooves 211 spacedly formed in the inner wall, a pair of longitudinal guides 212 respectively formed on upper and lower inner walls extended along the length thereof and a horizontal slot 213 adjacent front end. On the opposite side of the slot 213 is a depression 214 (as shown in FIG. 10) which is composed of a pair of semi-circles of reversed sloped surfaces. The second half 22 has a rectangular opening 221 extended along the length and a pair of guides 222 in the upper and lower walls of the opening 221.

The slider 30 has a thumbprint outer surface 31, a pair of outer guides 32 respectively formed in upper and lower edges each of which has a protrudent plate 321 at inner side, an inner sliding slot 33 which is formed by a pair of upper and lower L-shaped plates 331 in symmetrical manner, a U-shaped frame 341 extended rearward from the lower L-shaped plate 331 including a stopper 34 on the inner end, a pair of first semi-circular concaves 322 and a pair of second semi-circular concaves 323 spacedly and respectively formed in the upper and lower outer guides 32 of the slider 30. Wherein the L-shaped plates 331 can be able to slide in the longitudinal guides 212 of the first half 21 and the protrudent plates 321 of the outer guides 32 can be able to slide in the guides 222 of the second half 22.

Figure 4:
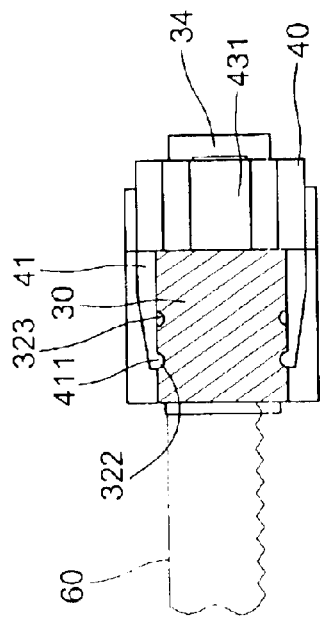
FIG. 4 is a sectional view to show a pair of hooks of the locking member hooked a pair of semi-circular concaves of the slider.

The locking member 40 has a pair of outer sliding bars 41 respectively and parallel extended forward from upper and lower edges each including hook 411 on inner end toward each other and engageable within the first and second semi-circular concaves 322 and 323 of the slider 30 (as shown in FIG. 4), an inner sliding plate 42 extended forward from inner edge including an elastic plate 43 in the center and a blade holder 432 of bevel end on a center of the elastic plate 43 and an elastic press block 431 on rear end connected to the elastic plate 43.

The swivel arrester 50 has a gripping plate 51 and a T-shaped lock 52 centrally projected from the back side of the gripping plate 51. The T-shaped lock 52 has a transverse bar inserted into the slot 213 of the first half 21 and engaged with the reverse sloped semi-circular surfaces of the depression 214.

Figure 5:
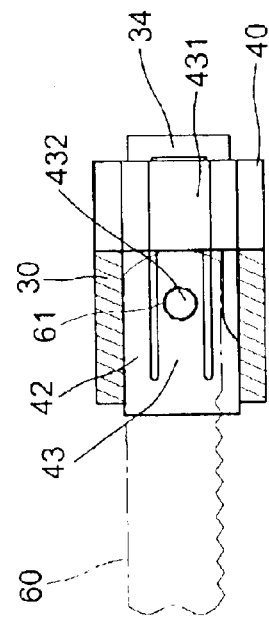
FIG. 5 is a sectional view a blade holder of the locking member engaged with a circular hole of the saw blade.
Figure 6:
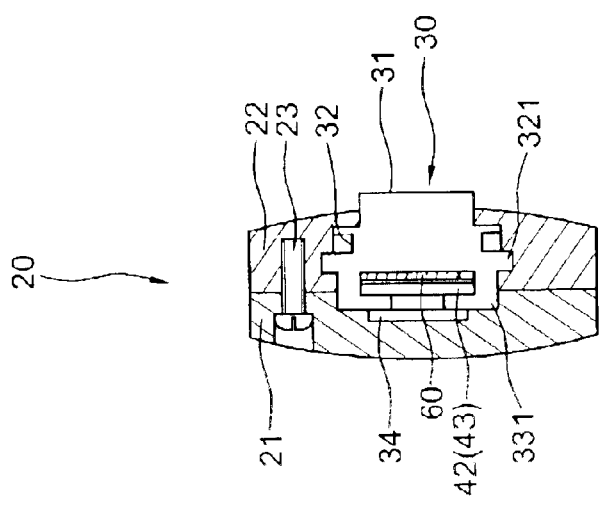
FIG. 6 is a vertical section indicating the slider and the locking member engaged within the handle.

The saw blade 60 has a circular hole 61 abutting each end and inserts into the inner sliding slot 33 of the slider 30 via the underside of the swivel arrester 50 and the gap of the handle 20 and its circular hole 61 is held by the blade holder 432 of the locking member 40 (as shown in FIGS. 5 and 6). When turns the swivel arrester for 90 degrees, The T-shaped lock 52 moves outward on the reverse sloped semi-circular surfaces of the depression 214. So that the 15 middle portion of the saw blade 60 is tightly gripped by the gripping plate 51.

Figure 11:
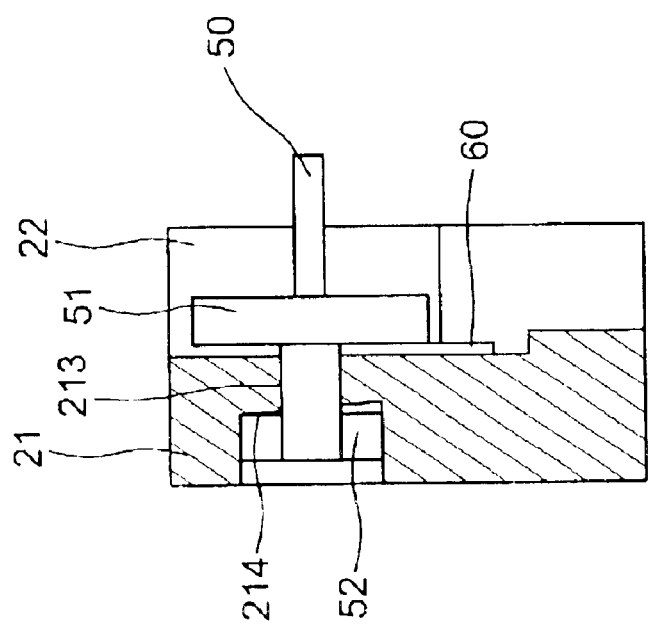
FIG. 11 is a sectional view to show that the swivel arrester is at fastening position.

When assembling, slide the pair of outer guides 41 and the inner sliding plate 42 of the locking member 40 respectively into the outer sliding slots 32 and the inner sliding slot 33 of the slider 30 with the pair of hooks 411 engaged within the pair of semi-circular concaves 322 (as shown in FIGS. 4 and 6). So that the slider 30 and the locking member are connected. Then put them on the longitudinal guides 212 of the first half 21 to have the L-shaped plates 331 sliding on the longitudinal guides 212 and the stopper 34 engaging within one of the vertical positioning grooves 211. And the combine the second half 22 with the first half by bolts 23 to have the proturdent plates 321 sliding within the guides 222 of the second half 22. Finally, insert the T-shaped lock 52 of the swivel arrester 50 into the slot 213 of the first half 21 (as shown in FIGS. 10 and 11). The engagement of the saw blade 60 into the handle 20 has been discussed as the above. FIG. 3 shows an outer look of the assembled handsaw of the present invention.

Before fastening the swivel arrester 50, the slider 30, can be able to slide about to adjust the outer length of the saw blade 60 and the stopper 34 follows the slider 30 to move longitudinally on the vertical positioning grooves 211 to emit snap sounds until an appropriate vertical positioning groove is sought. Then pulls the locking member 40 rearward to have the hooks 411 of the outer sliding bars 41 retreated to engage within the second semi-circular concaves 323 and the inner sliding plate 42 also retreated to press the stopper 34 to tightly engaged within the selected positioning groove 211. So that the slider 30 is unable to slide. Then fastens the swivel arrester 50 to fix the saw blade 60 (as shown in FIGS. 7 and 8).

Figure 9:
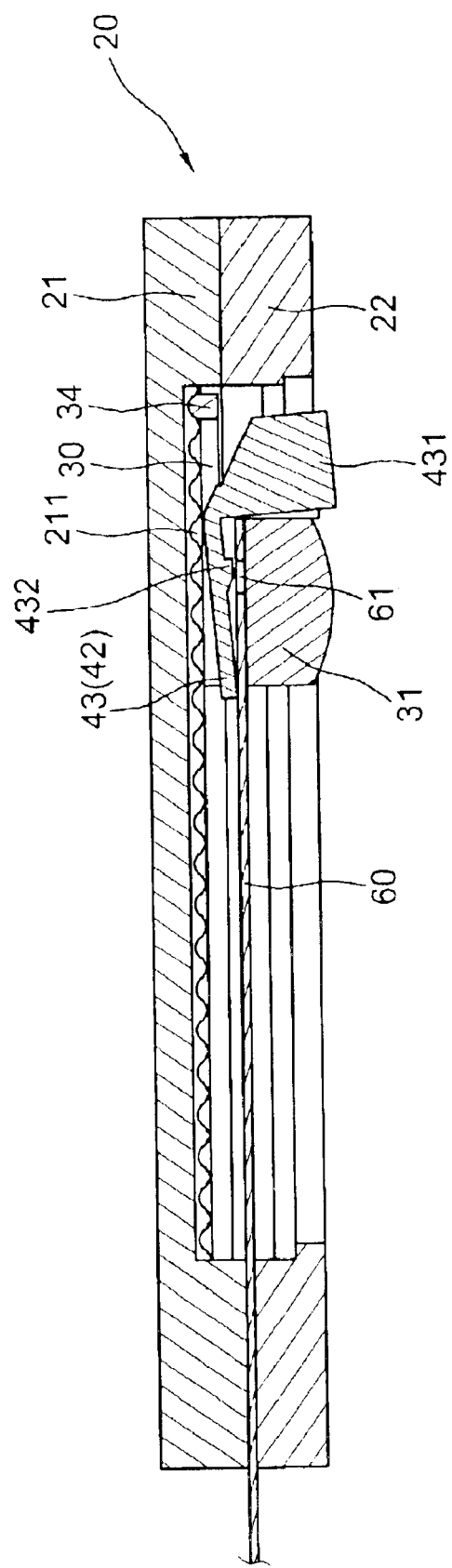
FIG. 9 is a sectional view to show that the press block is pushed inward.

If removes the saw blade 60 out of the handle 20, unfastens the swivel arrester 50 and presses the press block 431 of the locking member 40 inward so as to disengage the blade holder 432 with the circular hole 61. Then the saw blade 60 is readily drawn out of the handle 20 (as shown in FIG. 9). After the saw blade 60 is removed, release the press block 431 and get ready to wait for next engagement of the saw blade 60 into the handle 20.

Figure 12:
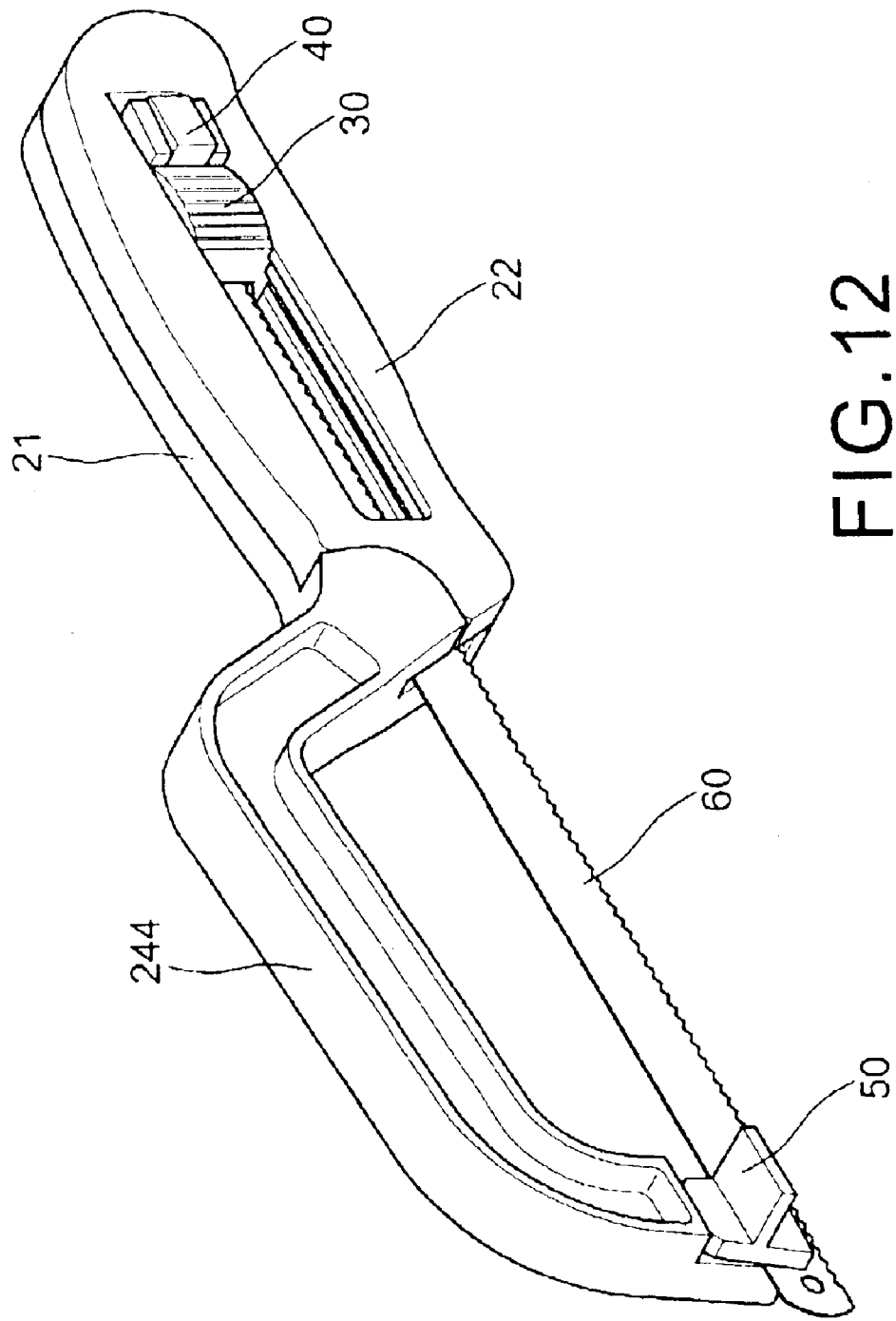
FIG. 12 is a perspective view to show an alternate embodiment of the present invention.

Referring to FIG. 12, an alternate embodiment of the mini-handsaw of the present invention is provided. In this embodiment, the structure and function are mostly similar to that of the above embodiment as described in FIGS. 2 to 11 and the above discussions are applicable in the most instance. The only difference is that a bowed frame 244 is connected to the front end of the handle 20 and the horizontal slot 213 together with the depression 214 are moved to a reduced free end of the bowed frame 244 (not shown) to coordinate with the swivel arrester 50 to fix the front end of the saw blade 60. The operation of this handsaw is almost no different from the operation of the above embodiment. The only purpose is to increase the stability of the saw blade 60.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A structure of handle for mini-handsaw comprising:

a handle combined with a first and a second halves and secured by a plurality of bolts to define a gap therebetween, wherein said first half having a plurality of vertical positioning groove in innerwall, a pair of first longitudinal guides on upper and lower inner walls extended along the length thereof and a horizontal slot adjacent front end on opposite side of which is a depression composed of a pair of semi-circular reverse sloped surfaces, said second half having a rectangular opening extended along the length thereof and pair of second longitudinal guides in upper and lower walls of said opening;

a slider having a thumbprint outer surface, a pair of outer guides respectively formed in upper and lower edges each having a protrudent plate at inner side slidable in the second longitudinal guides of said second half, an inner sliding slot symmetrically formed by a pair of upper and lower L-shaped plates which are slidable on the first longitudinal guides of said first half, a U-shaped frame extended rearward from said lower L-shaped plate having a stopper on inner end engageable within the vertical positioning grooves of said first half, a pair of first semi-circular concaves and a pair of second semi-circular concaves spacedly and respectively formed in said upper and lower outer guides;

a locking member slidably connected to the rear and of said slider having a pair of outer sliding bars respectively and parallel extended forward from upper and lower edges thereof slidable within outer guides of said slider each including a hook on inner end toward each other and engageable within the first and/or second semi-circular concaves of said slider, an inner sliding plate extended forward from inner edge slidably inserted into the inner sliding slot of said slider including an elastic plate in center, a bevel end blade holder on a center of the elastic plate and an elastic press block on rear end thereof connected to said elastic plate;

a swivel arrester having a gripping plate and a T-shaped lock centrally projected from inner surface of said gripping plate and inserted into the horizontal slot of said first half and engaged with the reverse semi-circular surfaces of said depression;

a saw blade having a circular hole abutting each end and inserted into the gap of said handle and the inner sliding slot of said slider until that the circular hole of said saw blade is held by the blade holder of said locking member.

2. The structure of handle as recited in claim 1 wherein said locking member is pulled rearward to fix said stopper into one of said vertical positioning grooves.

3. The structure of handle as recited in claim 1 wherein said press block is pressed inward to release the circular hole of said saw blade from said blade holder.

4. The structure of handle as recited in claim 1 wherein said swivel arrester turns 90° to grip a middle portion of said saw blade.

5. A structure of handle for mini-handsaw comprising:

a handle combined with a first and a second halves and secured by a plurality of bolts to define a gap therebetween, wherein said first half having a plurality of vertical positioning grooves in innerwall, a pair of first longitudinal guides on upper and lower inner walls extended along the length thereof, a bowed frame extended forward from front end thereof including a horizontal slot in a reduced end and a depression composed of a pair of semi-circular reverse sloped surfaces on opposite side of said slot, said second half having a rectangular opening extended along the length thereof and a pair of second longitudinal guides in upper and lower walls of said opening;

a slider having a thumbprint outer surface, a pair of outer guides respectively formed in upper and lower edges each having a protrudent plate at inner side slidable in the second longitudinal guides of said second half, an inner sliding slot symmetrically formed by a pair of upper and a lower L-shaped plates which are slidable on the first longitudinal guides of said first half, a U-shaped frame extended rearward from said lower L-shaped plate having a stopper on inner end engageable within the vertical positioning grooves of said first half, a pair of first semi-circular concaves and a pair second semi-circular concaves spacedly and respectively formed in said upper and lower outer guides;

a locking member slidably connected to the rear end of said slider having a pair of outer sliding bars respectively and parallel extended forward from upper and lower edges thereof slidable within the outer guides of said slider each including a hook on inner end toward each other and engageable within the first and/or second semi-circular concaves of said slider, an inner sliding plate extended forward from inner edge slidably inserted into the inner sliding slot of said slider including an elastic plate in center, a bevel end blade holder on a center of the elastic plate and an elastic press block on rear end connected to said elastic plate;

a swivel arrester having gripping plate and a T-shaped lock centrally projected from inner surface of said gripping plate and inserted into the horizontal slot of said first half and engaged with the reverse semi-circular surfaces of said depression;

a saw blade inserted into the gap of said handle and the inner sliding slot of said slider having a circular hole abutting each end being held by the blade holder of said locking member and an outer end gripped by said swivel arrester at the reduced end of said bowed frame.

6. The structure of handle as recited in claim 5 wherein said locking member is pulled rearward to fix said stopper into one of said vertical positioning grooves.

7. The structure of handle as recited in claim 5 wherein said press block is pressed inward to release the circular hole of said saw blade from said blade holder.

8. The structure of handle as recited in claim 5 wherein said swivel arrester turns 90° to grip the outer end of said saw blade.

* * * * *